(12) United States Patent
Thomas

(10) Patent No.: US 10,820,677 B2
(45) Date of Patent: Nov. 3, 2020

(54) CORDLESS HAIR DRYER WITH IONIZING SOLUTION

(71) Applicant: Sherron M Thomas, Ewa Beach, HI (US)

(72) Inventor: Sherron M Thomas, Ewa Beach, HI (US)

(*) Notice: Subject to any disclaimer, the term of this patent is extended or adjusted under 35 U.S.C. 154(b) by 357 days.

(21) Appl. No.: 14/848,809

(22) Filed: Sep. 9, 2015

(65) Prior Publication Data

US 2016/0353854 A1 Dec. 8, 2016

Related U.S. Application Data

(60) Provisional application No. 62/171,272, filed on Jun. 5, 2015.

(51) Int. Cl.
| | |
|---|---|
| A45D 19/16 | (2006.01) |
| A45D 20/14 | (2006.01) |
| H02J 7/02 | (2016.01) |
| A45D 20/12 | (2006.01) |

(52) U.S. Cl.
CPC ........... *A45D 19/16* (2013.01); *A45D 20/122* (2013.01); *A45D 20/14* (2013.01); *H02J 7/025* (2013.01); *A45D 2020/126* (2013.01); *A45D 2020/128* (2013.01); *A45D 2200/202* (2013.01)

(58) Field of Classification Search
CPC ...... A45D 19/16; A45D 20/122; A45D 20/04; A45D 20/08; A45D 2020/126; A45D 2020/128; A45D 2200/202; A45D 20/14; A45D 20/12; A45D 20/30; A45D 20/10; A45D 20/00; A45D 20/52; H02J 7/025; H02J 50/10; H02J 50/12
USPC ............... 34/96, 97, 283; 219/222, 227, 240
See application file for complete search history.

(56) References Cited

U.S. PATENT DOCUMENTS

| | | | | |
|---|---|---|---|---|
| 2,591,669 | A * | 4/1952 | Bucknell | A45D 20/12 219/242 |
| 4,114,022 | A * | 9/1978 | Braulke, III | A45D 20/00 132/212 |
| 4,258,731 | A * | 3/1981 | Tsujimoto | A45D 20/20 132/212 |
| 4,382,448 | A * | 5/1983 | Tittert | A45D 1/02 126/409 |
| 4,757,183 | A * | 7/1988 | Karey | A45D 20/10 219/543 |

(Continued)

*Primary Examiner* — Edelmira Bosques
*Assistant Examiner* — Bao D Nguyen
(74) *Attorney, Agent, or Firm* — The Roy Gross Law Firm, LLC; Roy Gross

(57) ABSTRACT

A hair dryer with an ionizing solution provides a translucent reservoir which contains an ionized solution. The hair dryer heats the solution into a vapor, and may then be used to apply the ionized vapor to a salon client's hair while styling it, to prevent brittleness, damage, and split ends. In one embodiment a cradle is provided for recharging a handheld hair dryer and storing various attachments which are ready for immediate use. When separated from the handheld hair dryer, the cradle transfers electric power to the hair dryer via resonant inductive coupling, creating an oscillating magnetic field which is converted to electric power by components within the hair dryer. A second embodiment provides a standing hair dryer. The hair dryer also provides wireless internet and power outlets for mobile electronic devices.

20 Claims, 3 Drawing Sheets

(56) References Cited

U.S. PATENT DOCUMENTS

| | | | | |
|---|---|---|---|---|
| 4,766,913 A * | 8/1988 | Klein | A45D 20/20 | 219/222 |
| 4,800,654 A * | 1/1989 | Levin | A45D 1/02 | 126/401 |
| 4,827,105 A * | 5/1989 | Brown, Jr. | A45D 20/12 | 219/222 |
| 4,914,273 A * | 4/1990 | Matsui | A45D 20/08 | 132/206 |
| 5,394,620 A * | 3/1995 | Chimera | A45D 20/10 | 34/97 |
| 6,053,180 A * | 4/2000 | Kwan | A01K 13/00 | 132/118 |
| 6,191,930 B1 | 2/2001 | Ramchandani | | |
| 6,725,562 B2 | 4/2004 | Nakagawa | | |
| 6,763,606 B2 | 7/2004 | Saida | | |
| 6,983,550 B1 * | 1/2006 | Lin | F23D 14/18 | 34/96 |
| 8,938,888 B1 * | 1/2015 | Brown | A45D 20/32 | 132/212 |
| 9,101,251 B1 * | 8/2015 | Moorhouse | F26B 21/06 | |
| 2003/0222069 A1 * | 12/2003 | Sena | A45D 1/20 | 219/222 |
| 2004/0129291 A1 * | 7/2004 | Ura | A45D 19/16 | 132/272 |
| 2006/0201016 A1 * | 9/2006 | Nakagawa | A45D 20/12 | 34/96 |
| 2008/0235980 A1 * | 10/2008 | Chasen | A45D 20/12 | 34/91 |
| 2009/0106567 A1 * | 4/2009 | Baarman | G06F 1/1628 | 713/300 |
| 2009/0147081 A1 * | 6/2009 | Hanson | A45D 20/12 | 348/77 |
| 2009/0160261 A1 * | 6/2009 | Elo | H02J 7/025 | 307/104 |
| 2012/0006805 A1 * | 1/2012 | Sani | A45D 20/12 | 219/222 |
| 2012/0186599 A1 * | 7/2012 | Schmid | A45D 7/02 | 132/210 |
| 2015/0157112 A1 * | 6/2015 | Daibes | A45D 44/06 | 132/229 |
| 2015/0289623 A1 * | 10/2015 | Matsui | H01T 23/00 | 34/97 |

* cited by examiner

CORDLESS HAIR DRYER WITH IONIZING SOLUTION

CROSS-REFERENCE TO RELATED APPLICATIONS

This application claims the benefit of U.S. Provisional Application No. 62/171,272, filed Jun. 5, 2015, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to hair care accessories and in particular to a cordless hair dryer with an ionizing solution. The hair dryer has become an essential item of equipment in professional hair styling salons. Unfortunately, frequently processed human hair becomes brittle and easily damaged, leading to breakage of the hair fiber and split ends. Also, the power cord of the hair dryer is inconvenient for the stylist, restricting movement. Existing technology from the field of medical devices and implants provides the solution. A cordless hair dryer with an ionizing solution, acquiring power from a generated magnetic field to apply an ionized vapor to the hair, would resolve these problems.

SUMMARY OF THE INVENTION

Accordingly, the invention is directed to a cordless hair dryer with an ionizing solution. The hair dryer provides a translucent, removable reservoir which contains an ionized solution. The hair dryer heats the solution into a vapor, and may then be used to apply the ionized vapor to a salon client's hair while styling it, to prevent brittleness, damage, and split ends. A cradle is provided for recharging the hair dryer and storing various attachments which are ready for immediate use. When separated from the hair dryer, the cradle transfers electric power to the hair dryer via resonant inductive coupling, creating an oscillating magnetic field which is converted to electric power by components within the hair dryer.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serves to explain the principles of the invention.

DETAILED DESCRIPTION OF THE INVENTION

Figure 1:
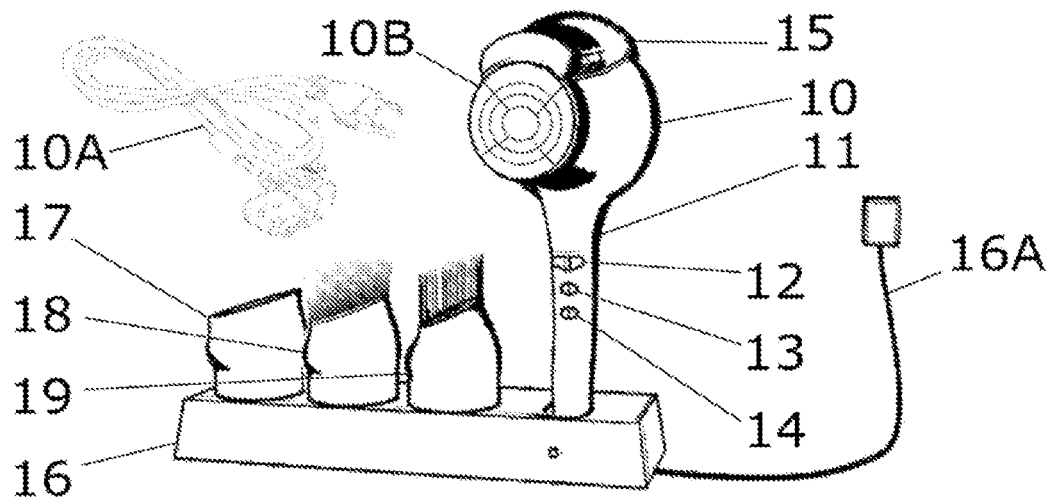
FIG. 1 is a front perspective view of several components of the first exemplary embodiment, displaying the handheld hair dryer 10, the hair dryer power cord 10A, the nozzle 10B, the handgrip 11, the burst button 12, the selector switch 13, the solution control 14, the reservoir 15, the cradle 16, the cradle power cord 16A, the first attachment 17, the second attachment 18, and the third attachment 19.
Figure 2:
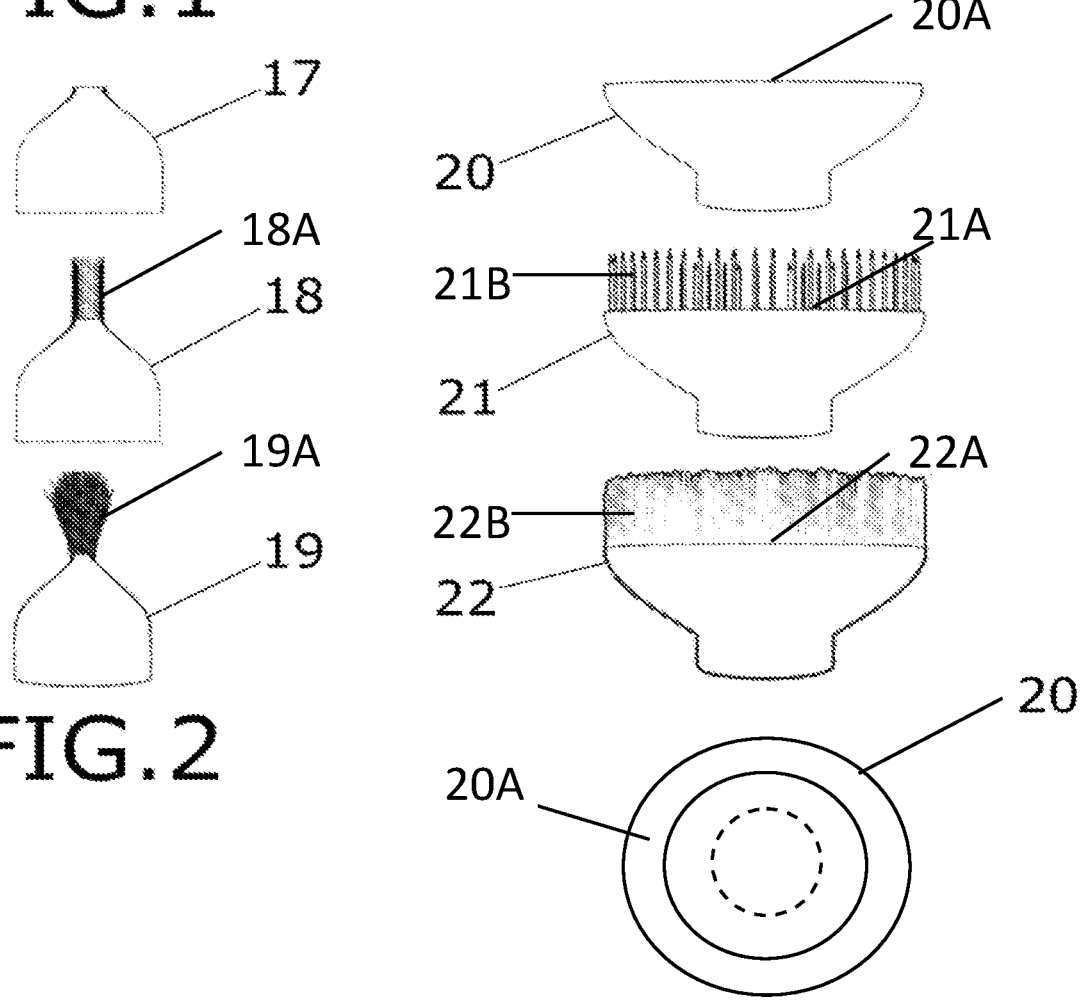
FIG. 2 is a side view of the attachments of the first exemplary embodiment, displaying the first attachment 17, the second attachment 18, the third attachment 19, the fourth attachment 20, the fifth attachment 21, and the sixth attachment 22.
Figure 3:
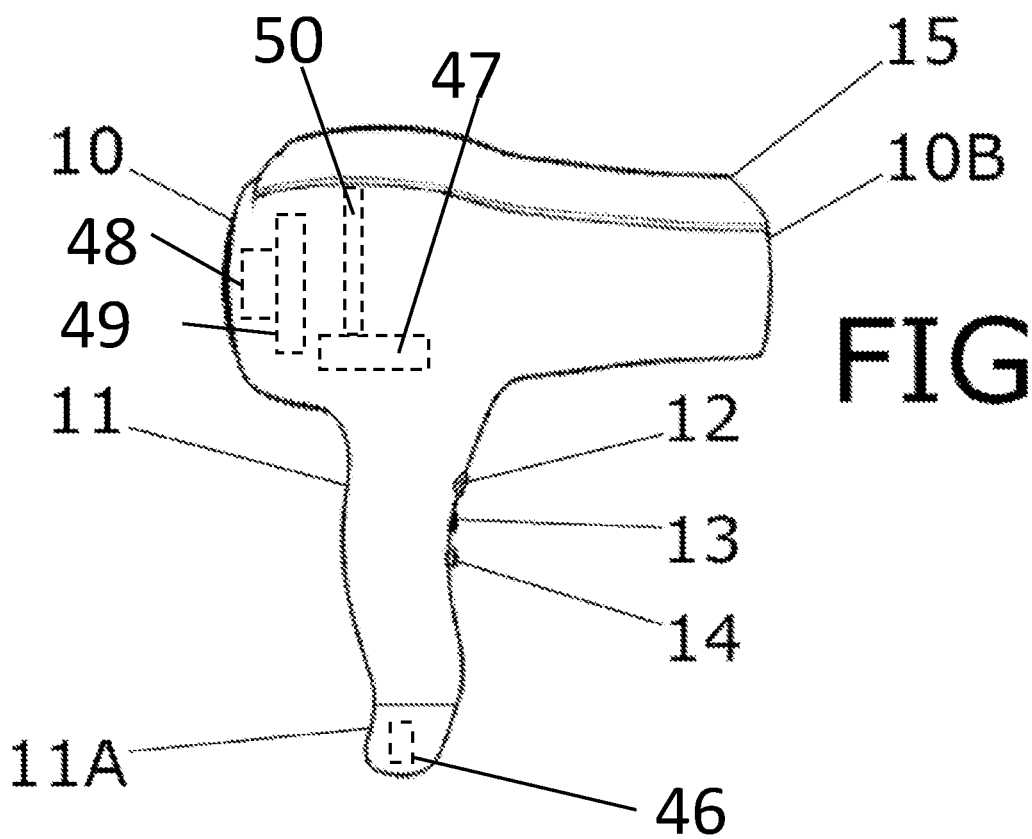
FIG. 3 is a side view of the hair dryer of the first exemplary embodiment, displaying the hair dryer 10, the nozzle 10B, the handgrip 11, the base 11A, the burst button 12, the selector switch 13, the solution control 14, and the reservoir 15.
Figure 4:
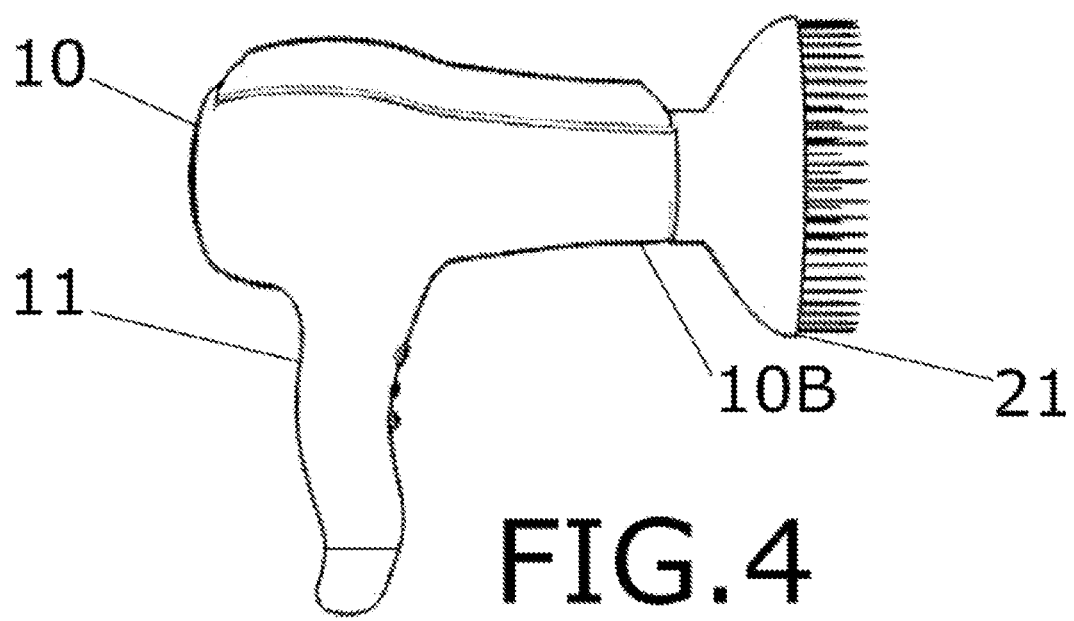
FIG. 4 is a side view of the hair dryer of the first exemplary embodiment with the fifth attachment affixed, displaying the hair dryer 10, the nozzle 10B, the handgrip 11, and the fifth attachment 21.
Figure 5:
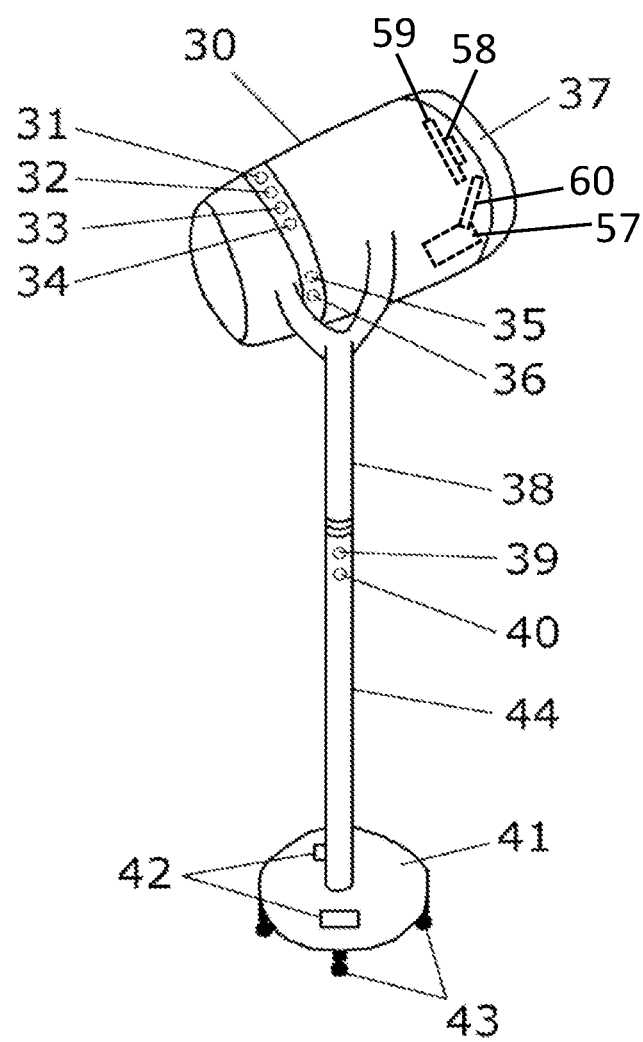
FIG. 5 is a perspective view of the second exemplary embodiment, displaying the standing hairdyer 30, the selection buttons 31-36, the ionized air/heat flow 37, the stand upper section 38, the stand lower section 44, the wifi 39, the blutooth 40, the circular base 41, the outlets 42, and the wheels 43.
Figure 6:
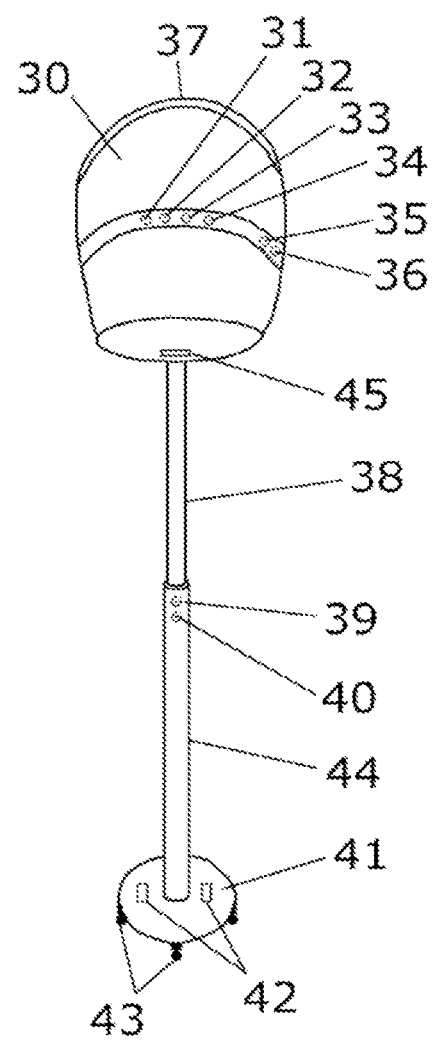
FIG. 6 is a front view of the second exemplary embodiment, displaying the standing hairdyer 30, the selection buttons 31-36, the ionized air/heat flow 37, the stand upper section 38, the stand lower section 44, the wifi 39, the blutooth 40, the circular base 41, the outlets 42, and the wheels 43.

Referring now to the invention in more detail, the invention is directed to a cordless hair dryer 10 with an ionizing solution.

The first exemplary embodiment is comprised of a handheld hair dryer 10 in a conventional pistol-type configuration, providing a removable reservoir 15 on its top surface. The reservoir 15 contains an ionized solution for use on hair at a styling salon, and is preferably translucent, enabling the user to clearly see how much solution remains in the reservoir 15. The hand held hair dryer 10 heats the solution into a vapor, and may then be used to apply the ionized vapor to a salon client's hair while the user styles the client's hair, to prevent brittleness, damage, and split ends.

An assortment of attachments is provided to enable the user to direct the vapor onto the client's hair while styling the hair in various ways. A cradle 16 is provided for recharging the hand held hair dryer 10 and storing the various attachments in upright positions such that they are ready for immediate use. When separated from the hair dryer 10, the cradle 16 transfers electric power to the hand held hair dryer 10 via resonant inductive coupling 46, creating an oscillating magnetic field which is then converted to electric power by components within the hair dryer 10.

The hand held hair dryer 10 may optionally be plugged into standard household current, using a hair dryer power cord 10A which is provided. At the lower end of the handgrip 11 of the handheld hair dryer 10, a removable base 11A is provided. The base 11A is hinged and functions as a cap which snaps open and closed easily, covering an electric plug which is provided within the handgrip 11. The electric plug within the handgrip 11 may be plugged into one end of the hair dryer power cord 10A and the other end may be plugged into any standard three-pronged wall outlet. The cradle 16 is contoured to accept the lower end of the handgrip 11 with the hinged base 11A in the opened position, providing a socket into which the electric plug may be inserted for direct recharging. The cradle 16 also provides a cradle power cord 16A which may be plugged into any standard three-pronged wall outlet.

The cradle 16 provides an internal magnetic coil which generates an oscillating magnetic field. The magnetic field is converted to electric power by the hair dryer 10, which also features an internal magnetic coil. Magnetic oscillations are produced by discharging voltage from a capacitor into a coil, such that the capacitor and coil are in an electrical loop. No other components will deter from the natural oscillations which result from the electrical current varying in direction as it goes through the coil, producing the magnetic field.

Alternate embodiments, wherein the cradle 10 also provides wireless recharging attachments, a WiFi connection, or both for smartphones and other personal electronic devices, are contemplated. Each of the wireless recharging attachments may be connected to a personal electronic device via any one of several standard data ports, preferably a universal service bus (USB) or Micro-USB port. Each wireless recharging attachment also features a rechargeable internal battery. At short ranges, such as five feet or less, electric power converted from the cradle 16 may be used simultaneously to recharge the internal battery of the wireless recharging attachment, recharge the battery of the personal electronic device, and operate the personal electronic device at full power.

Other electronic components of the cradle 16 include a capacitor, a magnetic coil, an internal antenna, a microprocessor, a memory device, and an optional modem and WiFi router. Electronic components of the hair dryer 10 include a magnetic coil, a rechargeable battery or batteries, and the necessary switches to divert electric power as desired to recharging the batteries, operate the hair dryer 10, or both. The range of the system is greater than the conventional power cord or wired recharging device, operating all features of the hair dryer 10 at full power at distances up to ten feet from the cradle 16, although the effectiveness of the system is inversely proportional with the range. At distances greater than ten feet, the hair dryer 10 detects the drop in power and switches to the rechargeable batteries.

The hair dryer 10 draws ionized solution from the removable reservoir 15 via a one-way valve, and provides an internal heating element 47 which vaporizes the solution as it enters an internal chamber. An internal fan 49 then propels the vapor through the nozzle 10B and any attachment which may be affixed to the nozzle 10B, to treat the client's hair. Each of the attachments provides screw threads such that it may be securely affixed to the nozzle 10B without leaking vapor.

On the front surface of the handgrip 11, three controls are provided: the burst control 12, which causes a two-second burst of additional electric power to the fan motor 48 when pressed; the selector switch 13, which provides an array of basic speeds, such as low speed, medium speed, and high speed, toggling through the basic speeds when pressed; and the solution control 14, which opens a one-way valve 50 enabling flow of the solution into the hair dryer 10 when pressed, and closes the one-way valve 50 when pressed again.

The first attachment 17 provides a long, narrow slit for applying vapor with no styling, or while the user styles the hair with some other styling implement, such as a curling iron or hairbrush. The second attachment 18 provides a long, narrow slit with semi-rigid bristles 18A for styling. The third attachment 19 provides a long, narrow slit with soft, flexible bristles 19A for styling.

The fourth attachment 20, fifth attachment 21, and sixth attachment 22 are large and circular 20A, 21A, and 22A, such as four inches in diameter, for the purpose of spreading the vapor over a broad area of the client's hair. The fourth attachment 20 provides a simple, ring-shaped slit or circular opening 20A around its perimeter for expelling the vapor. The fifth attachment 21 provides comb teeth 21B around its perimeter, with a small passage for vapor through the length of each tooth, terminating in a small, circular aperture at the tip of the tooth. The sixth attachment 22 provides a ring-shaped slit around its perimeter, with soft, flexible bristles 22B for styling.

The hand held hair dryer 10 and the cradle 16 are preferably manufactured from rigid, durable materials such as steel, aluminum alloy, copper alloy, brass, and plastic. The burst button 12, the selector switch 13, and the solution control 14 are preferably manufactured from a flexible, durable material such as silicone or rubber. The first attachment 17, the second attachment 18, the third attachment 19, the fourth attachment 20, the fifth attachment 21, and the sixth attachment 22 are preferably manufactured from a rigid, durable material such as plastic. The semirigid bristles 18A on the second attachment 18 are preferably manufactured from boar bristles or nylon. The soft bristles 19A and 22B on the third attachment 19 and the sixth attachment 22 are preferably manufactured from horsehair.

The second exemplary embodiment is comprised of a standing hair dryer 30, providing a reservoir 37 on its top surface. The reservoir 37 contains an ionized solution for use on hair at a styling salon, and is preferably translucent, enabling the user to clearly see how much solution remains in the reservoir 37. The standing hair dryer 30 heats the solution into a vapor, and may then be used to apply the ionized vapor to a salon client's hair while the user styles the client's hair, to prevent brittleness, damage, and split ends.

The standing hair dryer 30 provides buttons for different modes. The first mode button 31 is for a regular dry/wrap. The second mode button 32 is for conditioning/treatment. The third mode button 33 is for hair coloring. The fourth mode button 34 is for a hair steamer. The standing hair dryer 30 also provides a hair temperature sensor 45, which automatically shuts off the standing hair dryer 30 if the temperature of the user's hair reaches a predetermined amount. Further buttons may include a power button configured to activate the standing hairdryer, and a self-cleaning button configured to activate a cleaning mode on the standing hairdryer.

The reservoir 37 holds an ionized solution. When activated, the reservoir 37 releases the ionized solution via a one-way valve 60, and provides an internal heating element 57 which vaporizes the solution as it enters an internal chamber. An internal fan 59, having a fan motor 58, then propels the vapor through the standing hair dryer 30 to treat the client's hair.

The standing hair dryer 30 is supported by a stand having a stand upper section 38 and a stand lower section 44. The stand lower section provides a wireless internet connection 39 and a Bluetooth connection 40 providing short-wavelength UHF data connection. The stand upper section 38 height is adjustable by telescoping within the stand lower section 44. The stand lower section is supported by a circular base 41. The circular base has wheels 43 attached to a bottom surface and provides charging outlets 42 on a top surface.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A cordless hairdryer system, comprising:
    a handheld hairdryer being in a conventional pistol configuration, said handheld hairdryer having
        a housing including a handgrip with a bottom portion, said bottom portion configured to receive power,
        a reservoir storing a solution and having an outlet, and
        an internal heating element, said internal heating element being configured to vaporize said solution upon release of said solution from said reservoir outlet and activation of the hairdryer, and
        a nozzle being a final exit port for said solution from said hairdryer, wherein said solution exits the nozzle in the vaporized form; and a cradle, said cradle having
        a base,
        a cradle power cord, said cradle power cord being configured to attach to a standard three prong wall outlet;
        said bottom portion of said handgrip being configured to plug into said cradle to charge said hairdryer.

2. The cordless hairdryer of claim 1, wherein said reservoir is attached to a top surface of said handheld hairdryer; said reservoir being translucent.

3. The cordless hairdryer of claim 1, wherein said handheld hairdryer is configured to propel said vaporized solution out of said handheld hairdryer and onto a user's hair.

4. The cordless hairdryer of claim 1, wherein said cradle is configured to transfer electrical power to said handheld hairdryer via resonate inductive coupling and said handheld hairdryer is configured to receive electrical power from said cradle via resonant inductive coupling.

5. The cordless hairdryer of claim 1, further comprising a removable base; said removable base being configured to cover said bottom portion; said removable base being further configured to uncover said bottom portion when removed.

6. The cordless hairdryer of claim 1, wherein the hairdryer is configured to mate with a plurality of attachments; said plurality of attachments including: a nozzle, a nozzle with bristles, a circular opening, a circular opening with comb teeth around the perimeter, and a circular opening with bristles.

7. The cordless hairdryer of claim 1, further comprising a plurality of control buttons; said plurality of control buttons being located on said handgrip; said plurality of control buttons including: a burst control configured to cause two second bursts of additional electric power to a fan motor located within said hairdryer, a speed control configured to adjust a speed of said fan motor, and a solution control configured to supply said solution to said internal heating element when activated.

8. The cordless hairdryer of claim 1, wherein said solution is an ionized solution.

9. A cordless standing hairdryer comprising:
    a housing,
    a reservoir storing a solution,
    an internal heating element, said internal heating element being configured to vaporize said solution upon release of said solution and activation of the hairdryer,
    at least one nozzle being a final exit port for said solution from said hairdryer onto user's hair, wherein said solution exits the at least one nozzle in the vaporized form,
    a plurality of control buttons,
    a temperature sensor, and
    a stand having an upper section and a lower section, a circular base, and wheels; said stand being adjustable in height by said upper section telescoping within said lower section.

10. The cordless standing hairdryer of claim 9, wherein said reservoir is attached to the housing of said hairdryer at the rear of the housing; said reservoir being translucent.

11. The cordless standing hairdryer of claim 9, wherein said standing hairdryer is configured to propel said vaporized solution out of said standing hairdryer and onto a user's hair.

12. The cordless standing hairdryer of claim 9, wherein said plurality of control buttons include: a plurality of mode buttons configured to select a mode of the standing hairdryer and a power button configured to activate the standing hairdryer.

13. The cordless standing hairdryer of claim 12, wherein said plurality of mode buttons include: a regular dry/wrap mode, a conditioning/treatment mode, a hair coloring mode, and a hair steamer mode.

14. The cordless standing hairdryer of claim 9, wherein said temperature sensor is configured to deactivate said standing hairdryer if said temperature sensor senses a user's hair reaches a predetermined amount.

15. The cordless standing hairdryer of claim 9, wherein said circular base further comprises power outlets on a top surface of said circular base.

16. The cordless standing hairdryer of claim 9, further comprising a wireless transmitter; said wireless transmitter being configured to provide wireless internet access to a user of said standing hair dryer.

17. The cordless standing hairdryer of claim 9, further comprising a short-wavelength UHF data connection; said short-wavelength UHF data connection being configured to provide wireless data access to a user of said standing hair dryer.

18. The cordless standing hairdryer of claim 9, wherein said solution is an ionized solution.

19. A cordless hairdryer, comprising:
    a housing comprising an internal heating element and an internal chamber, and having a top surface and a handle portion;
    a reservoir storing a solution, wherein said reservoir is attached to the top surface of said cordless hairdryer; and
    a one-way valve;

wherein said solution flows through said one-way valve from said reservoir to said internal chamber, wherein, upon activation of the hairdryer, said internal heating element vaporizes said solution into a vapor, and wherein said vapor is configured to be propelled onto a user's hair.

20. The cordless hairdryer of claim 19, further comprising an internal fan that propels the vapor through the hairdryer.

\* \* \* \* \*